(12) United States Patent
Day

(10) Patent No.: US 7,552,559 B2
(45) Date of Patent: Jun. 30, 2009

(54) REMOTELY-CONTROLLED ADJUSTABLE ZOOM SCOPE

(76) Inventor: Fred Day, 1116 Henry St., Belle Vernon, PA (US) 15012

( * ) Notice: Subject to any disclaimer, the term of this patent is extended or adjusted under 35 U.S.C. 154(b) by 127 days.

(21) Appl. No.: 11/461,043

(22) Filed: Jul. 31, 2006

(65) Prior Publication Data
US 2008/0028663 A1 Feb. 7, 2008

(51) Int. Cl.
*F41G 1/38* (2006.01)
(52) U.S. Cl. .......................................... 42/122; 42/119
(58) Field of Classification Search ................. 42/119, 42/122–127, 142, 188, 304.4, 313.3, 314.2, 42/321.5, 457; 89/36.01, 36.02, 36.03, 36.04, 89/36.07, 36.08, 36.09, 36.12, 36.17; 33/266
See application file for complete search history.

(56) References Cited

U.S. PATENT DOCUMENTS

| | | | |
|---|---|---|---|
| 4,644,845 A * | 2/1987 | Garehime, Jr. ............. | 89/41.05 |
| 5,276,554 A | 1/1994 | Nassivera | |
| 5,388,005 A | 2/1995 | Wilson | |
| 5,528,847 A | 6/1996 | Fisher et al. | |
| 5,669,174 A * | 9/1997 | Teetzel ........................ | 42/115 |
| 6,519,083 B2 | 2/2003 | Heinrich | |
| 6,615,531 B1 * | 9/2003 | Holmberg ..................... | 42/142 |
| 6,813,025 B2 * | 11/2004 | Edwards ...................... | 356/422 |
| 6,886,287 B1 * | 5/2005 | Bell et al. ..................... | 42/120 |
| 6,898,890 B2 * | 5/2005 | Gaber .......................... | 42/123 |
| 2003/0163943 A1 * | 9/2003 | Holmberg ..................... | 42/142 |
| 2004/0079018 A1 * | 4/2004 | Holmberg ..................... | 42/142 |
| 2005/0115141 A1 * | 6/2005 | Holmberg ..................... | 42/144 |
| 2006/0254116 A1 * | 11/2006 | Holmberg ..................... | 42/142 |
| 2007/0157502 A1 * | 7/2007 | Holmberg ..................... | 42/124 |
| 2007/0214698 A1 * | 9/2007 | Hung et al. ................... | 42/111 |
| 2007/0214700 A1 * | 9/2007 | Chang .......................... | 42/119 |

* cited by examiner

*Primary Examiner*—Bret Hayes
(74) *Attorney, Agent, or Firm*—Greenbaum Doll & McDonald PLLC; Glenn D. Bellamy

(57) ABSTRACT

Shown is a system for power adjustment of an adjustable parameter of a telescopic site. The system includes a power supply, a reversible motor, a reduction drive, and a wireless receiver in a housing. A wireless controller/transmitter is in operable communication with the wireless receiver and is operable by a user to provide at least two commands to the wireless receiver. The controller/transmitter includes first and secondary momentary contact push button switches for controlling the commands and is adapted to the secured to one or more of the users fingers in preselected positions such that the switches stay in place on the users hand regardless of the users hand position. This may include an at least partial glove that carries the switches and the wireless controller/transmitter.

11 Claims, 7 Drawing Sheets

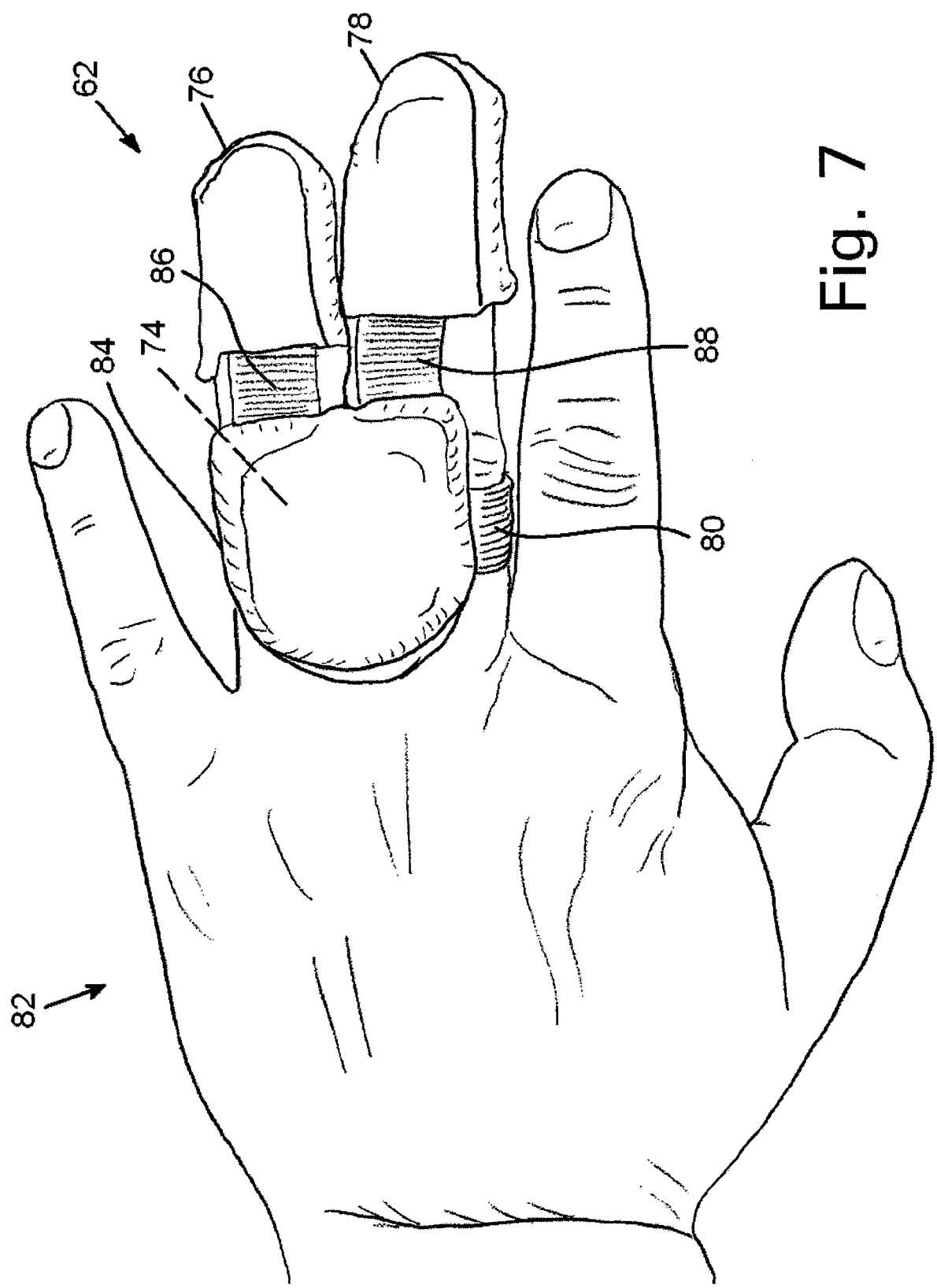

REMOTELY-CONTROLLED ADJUSTABLE ZOOM SCOPE

FIELD OF THE INVENTION

The present invention relates to rifle scopes, spotting scopes, shotgun scopes, and related optic devices. More particularly, it relates to remotely controlling such optics that have variable magnification or zoom capabilities.

BACKGROUND

The use of rifle scopes, shotgun scopes, spotting scopes, and related optics (generally referred to herein as "scopes" or "telescopic sights") is well known in the prior art. A wide variety of designs have been developed for the fulfillment of countless objectives and requirements. Many common scopes are designed with variable magnification power capability, providing the ability to "zoom in" on an object or target (collectively referred to as "target" hereafter) viewed through the scope. The increase in magnification results in a corresponding decrease in the field of view through the scope, however. Accordingly, if one attempts to "zoom in" or increase the magnification without carefully maintaining the target in the center of the field of view, it is easy to lose sight of the target from the field of view. This results in having to reacquire a view of the target through the scope, sometimes only after first reducing the magnification power to increase the field of view, and often after moving one's eye away from the eyepiece (or ocular lens).

Many high quality variable magnification scopes require significant hand strength and force to rotate the magnification adjustment ring, usually located just forward of the eyepiece, especially those that are tightly sealed from the internal hydrogen gas and the atmosphere. Applying this force while attempting to maintain sight of the target through the scope can be challenging because the entire scope and/or rifle to which it is mounted is often moved about while the adjustment is made.

Others have addressed this issue by providing a manually-operated and remotely controlled adjustment system such as that shown in U.S. Pat. No. 5,276,554, issued to Theodore S. Nassivera on Jan. 4, 1994. In that system, manipulation of a mechanical linkage by the shooter's thumb operates the magnification adjustment of a rifle scope. A similar mechanical linkage device is shown in U.S. Pat. No. 5,528,847 issued to Timothy D. Fisher et. al. on Jun. 25, 1996.

Alternatively, others have attempted to retrofit a battery-powered motor onto a rifle scope to provide a motorized magnification adjustment means. U.S. Pat. No. 5,388,005 issued to Steven W. Wilson on Feb. 7, 1995 is one such example. The device shown therein is controlled by a switch that can be mounted somewhere on the stock of the rifle and interconnects the power source and motor by way of wires. U.S. Pat. No. 6,519,083 issued to James A. Heinrich on Feb. 11, 2003 shows another example. This reference shows a retro-fit device in which an electric motor is connected via a drive belt to the zoom adjustment ring of a rifle scope. This reference also discloses the use of a wireless radio frequency transmitter and receiver such that a controller may be placed on the forestock or pistol grip of the rifle in a location convenient to the marksman.

Each of these latter examples require that the marksman use and maintain a single, preselected hand position in order to control the scope adjustment.

SUMMARY OF THE INVENTION

In view of the disadvantages inherent in the known prior art of rifle scopes, shotgun scopes, spotting scopes, and related optic devices that are equipped with variable zoom capabilities, the present invention provides a new, easy and convenient construction developed for the purpose of zooming the scope via a remote sending unit that works in conjunction with and in cooperation with the electric motor and power unit attached to, or incorporated into, the scope.

The general purpose of the present invention is to provide the user of the scope a means of zooming the same without having to turn the zoom operating device by hand and without having the controller fixed to the rifle stock or loose to be fumbled, dropped, or lost.

The present invention provides a system for power adjustment of an adjustable parameter, such as magnification or focus, of a telescopic site. The system includes a power supply, a reversible motor, a reduction drive, and a wireless receiver within a housing. The reduction drive operably interconnects the motor to an adjustable member of the telescopic site. The wireless receiver is operably connected to the power supply and the motor to selectively operate the motor so that it may manipulate the adjustable parameter of the telescopic site. A wireless controller/transmitter is in operable communication with the wireless receiver and is operable by a user to provide at least two commands to the wireless receiver. The controller/transmitter includes first and second momentary contact push button switches for controlling the commands. The switches are adapted to be secured to at least one of the users fingers in preselected positions such that the switches stay in place on the users hand regardless of the users hand position.

According to one embodiment, the wireless controller is in communication with the wireless receiver via radio frequency signals. The system may include an at least partial glove that carries the switches and the wireless controller/transmitter. The switches may be positioned in fingertip portions of separate glove fingers.

The system may include a learnable communication signal, in the event the controller/transmitter is lost, misplaced, or fails, the user may learn a new controller/transmitter to the communication signal. Additionally, a single learnable controller/transmitter may be used for multiple receiving units.

Secondary control switches may be included on the housing to be usable in the event of failure by the wireless controller/transmitter. The system may also include a visual indicator, mechanically or otherwise operated, on the housing for showing the position of the adjustable parameter of the telescopic site, such as with a pointer and reference indicia.

These, together with other objectives of the invention, and along with the various features of novelty which characterize the invention, are pointed out with particularity in the claims annexed to and forming part of this disclosure. For a better understanding of this invention, its operating advantages and the specific objects attained by its users, reference should be made to the accompanying drawings and descriptive matter in which there are illustrated preferred embodiments of the invention.

BRIEF DESCRIPTION OF THE DRAWING

Like reference numerals are used to indicate like parts throughout the various figures of the drawing, wherein:

FIG. 7 is a back view of the embodiment shown in FIG. 6.

BEST MODE FOR CARRYING OUT THE INVENTION

Figure 1:
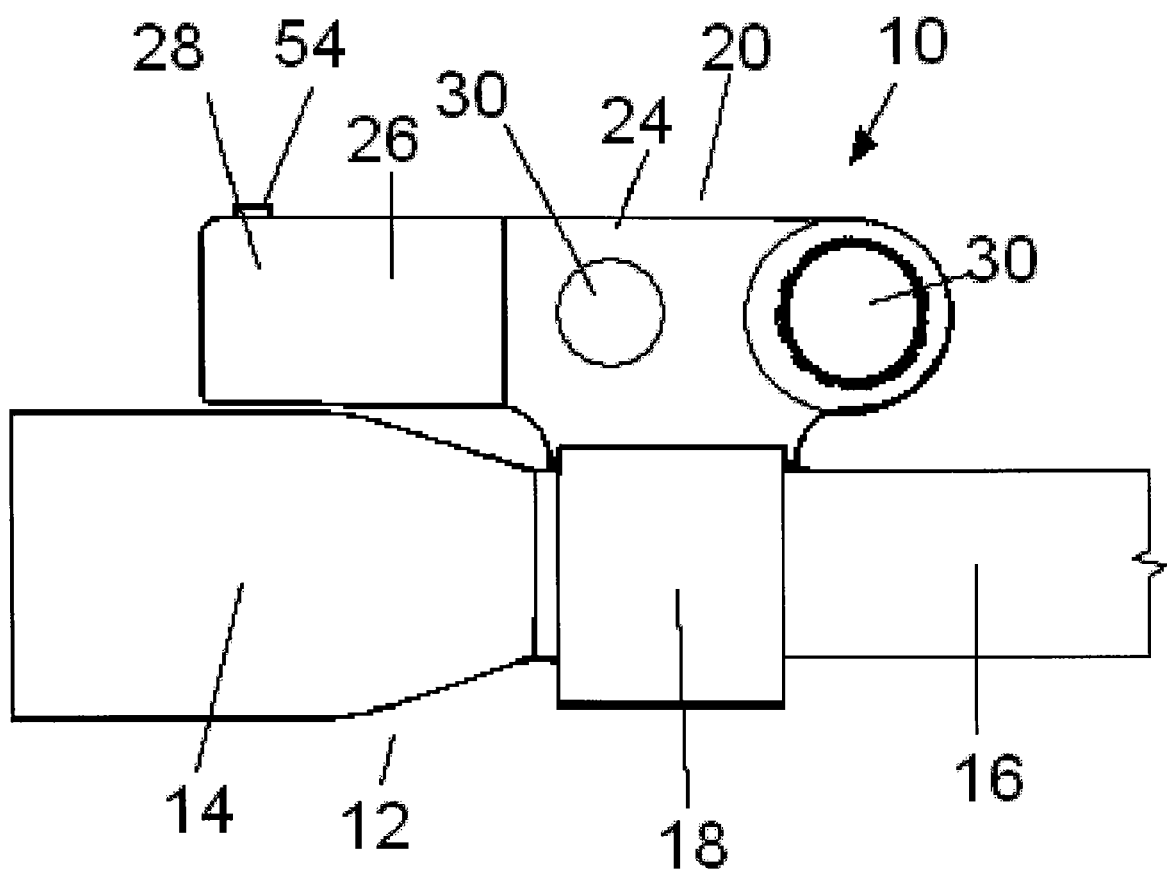
FIG. 1 is a side plan view of a preferred embodiment of the present invention incorporated into a typical scope.
Figure 2:
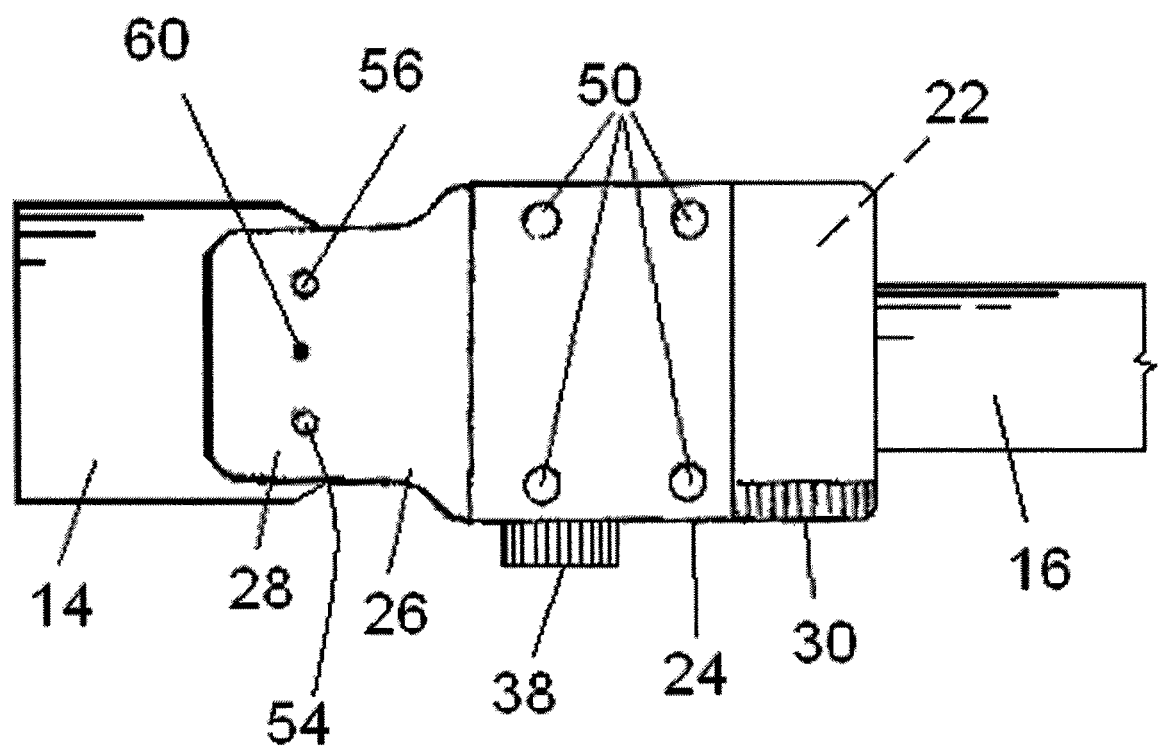
FIG. 2 is a top plan view thereof.
Figure 3:
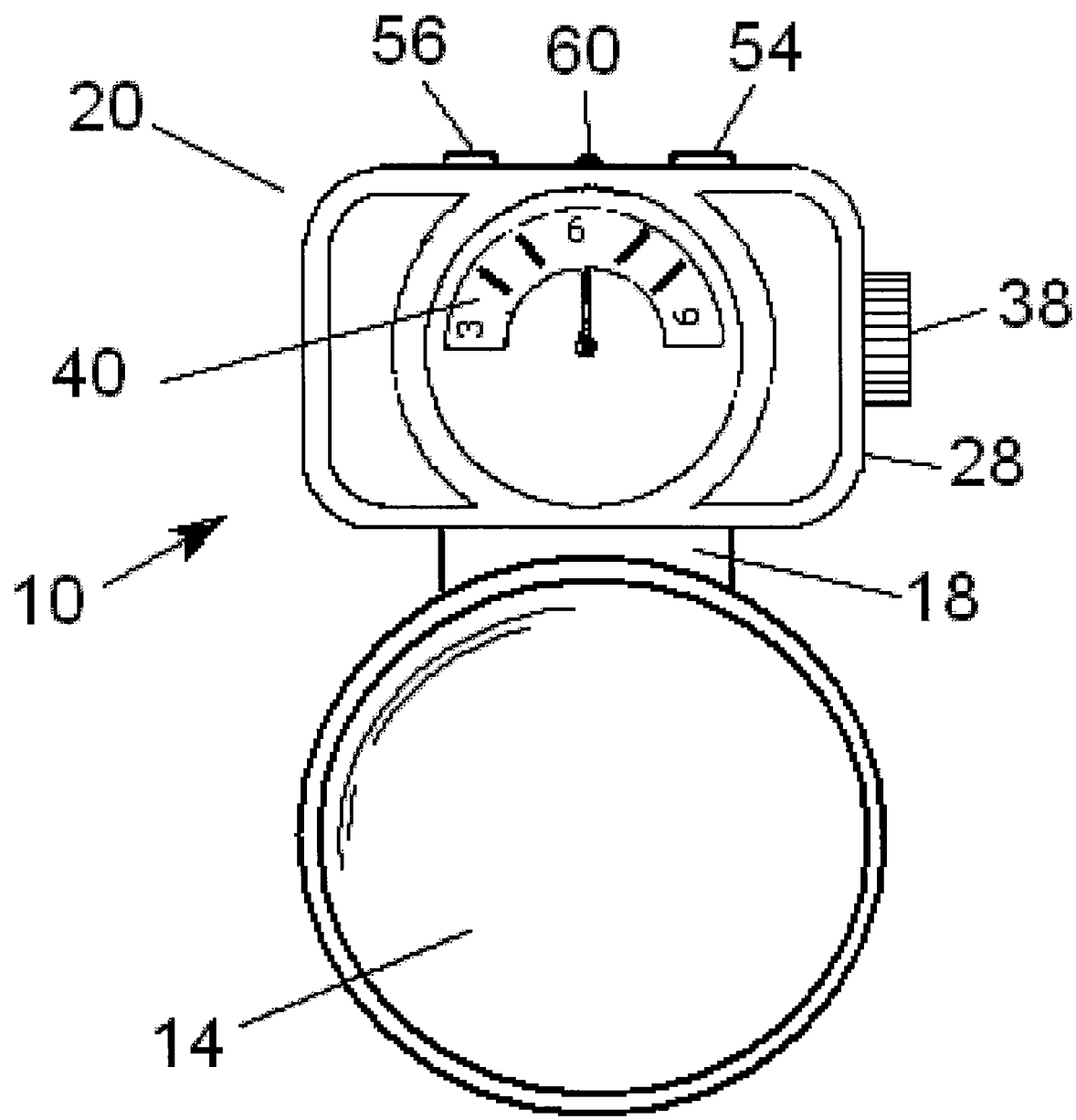
FIG. 3 is a front or ocular lens view thereof.

Referring now to the various figures of the drawing, and first to FIGS. 1-3, therein is shown at 10 a preferred embodiment of the zoom (or focus) adjustment mechanism of the present invention. The device 10 may be attached to or built in conjunction with a scope 12 of variable magnification power but otherwise ordinary design. The scope 12 includes an eye piece or ocular lens end 14, an elongated barrel 16, and an objective lens (not shown) at an opposite, forward end. Typically in a variable magnification power scope, a magnification adjustment ring (not shown) is located at a rearward end of the barrel 16, immediately forward of the eyepiece 14. The adjustment ring is rotated concentric to the barrel 16 to move an internal lens axially, thereby adjusting the internal focal length and, as a result, the magnification provided by the scope 12. According to the present invention, the location where the magnification or zoom adjustment ring would be located is covered by a housing 18 which encloses the internal zoom adjustment mechanism and supports the remainder of the device 10. The scope 12 is mounted securely to a rifle, shotgun or other device using standard mounting rings (not shown).

An upper housing 20, which encloses an electric motor 32, a power source 58, radio frequency receiver electronics 52, and external controls is typically positioned above the scope 12 for convenience. The upper housing 20 may include a battery compartment 22, a mechanics (or gear reduction drive assembly) compartment 24, an electronics and motor compartment 26, and a control/indicator panel region 28. The battery compartment 22 may be physically separated from the remaining interior of the upper housing 20 for safety reasons. A separate battery access door or cap 30 may be provided for easy external access to change the battery 58 without having to open any other part of the main housing 20.

Figure 4:
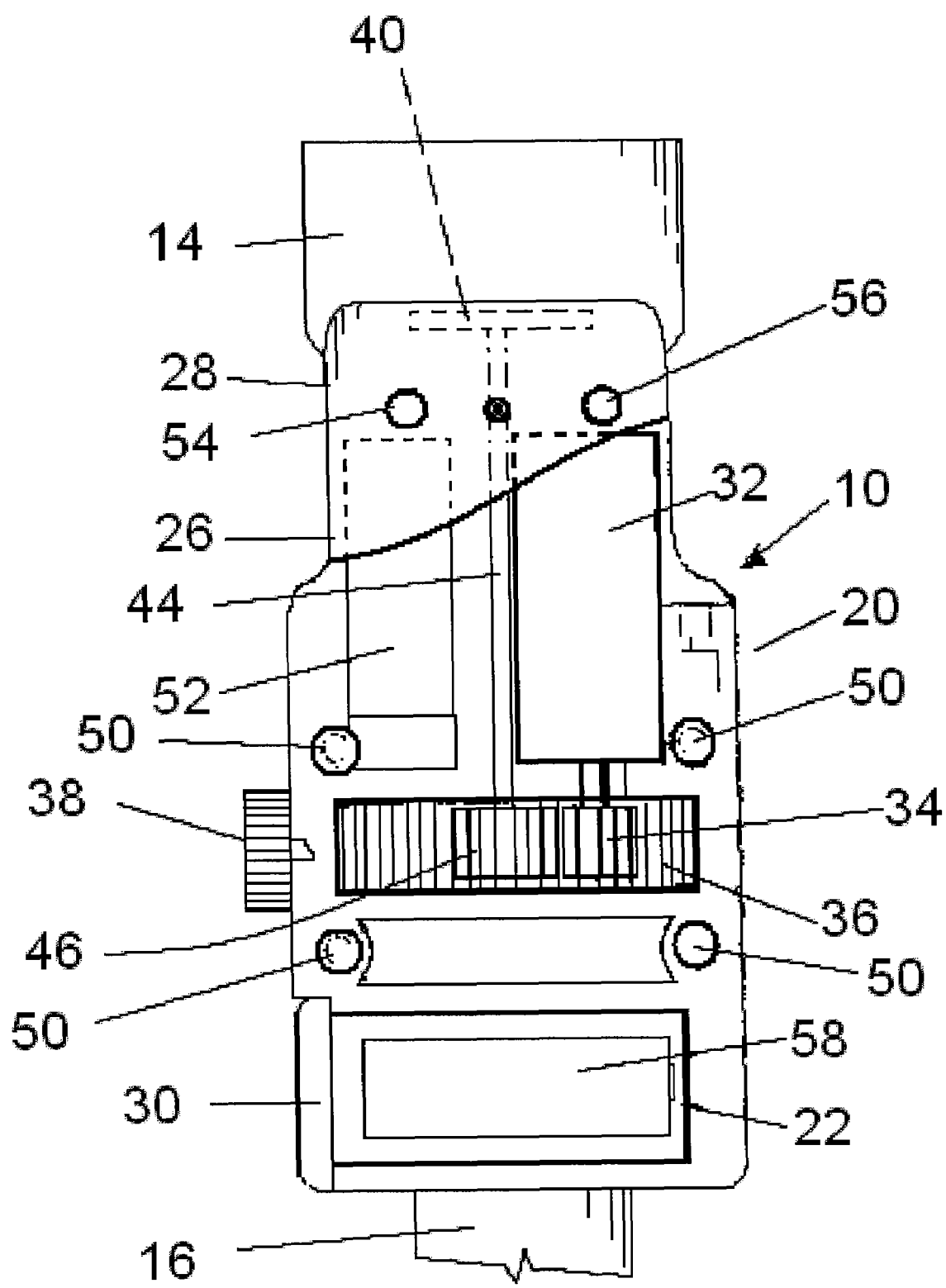
FIG. 4 is a partially cut away top view showing relative placement of internal parts.

Referring now also to FIG. 4, a small electric motor 32 is mechanically connected via gears 34 or other means to an engageable zoom adjustment ring or gear 36. A series of speed reduction gears according to a commonly known configuration may be necessary or useful in order to actuate the zoom adjustment ring 36 using a low power, low torque motor 32. Optionally, an external adjustment knob 38 may be mechanically interconnected to the gearing system 34, 36 such that rotation of the knob 38 will allow manual adjustment of the magnification in the event of equipment or battery failure. Access to the mechanics compartment for assembly or repair may be had by the removal of an access panel 48 held in place by screws 50 or other well know attachment means.

The device 10 may also include a viewable indicator dial 40 which may be mechanically or otherwise connected to the zoom adjustment ring 36 or other gearing 34 to indicate the magnification status of the scope 12. For example, a dial indicator 40 may be connected by a drive axle 44 to a gear 46 that engages an appropriate portion of the gearing mechanism 34, 36.

The motor 32 may be electronically controlled 52 either remotely, via radio frequency or infrared, or by pressing on-board buttons 54, 56 conveniently positioned on the housing 20, 28. Power from the battery 58 is selectively delivered to the motor 32 to operate in both forward and reverse directions. Electronics 52 necessary to control the motor 32 either remotely or from on-board controls 54, 56 may be designed and made in accordance with any of several constructions that are well know in the prior art. A power indicator light 60 may also be conveniently positioned for viewing by the user.

Figure 5:
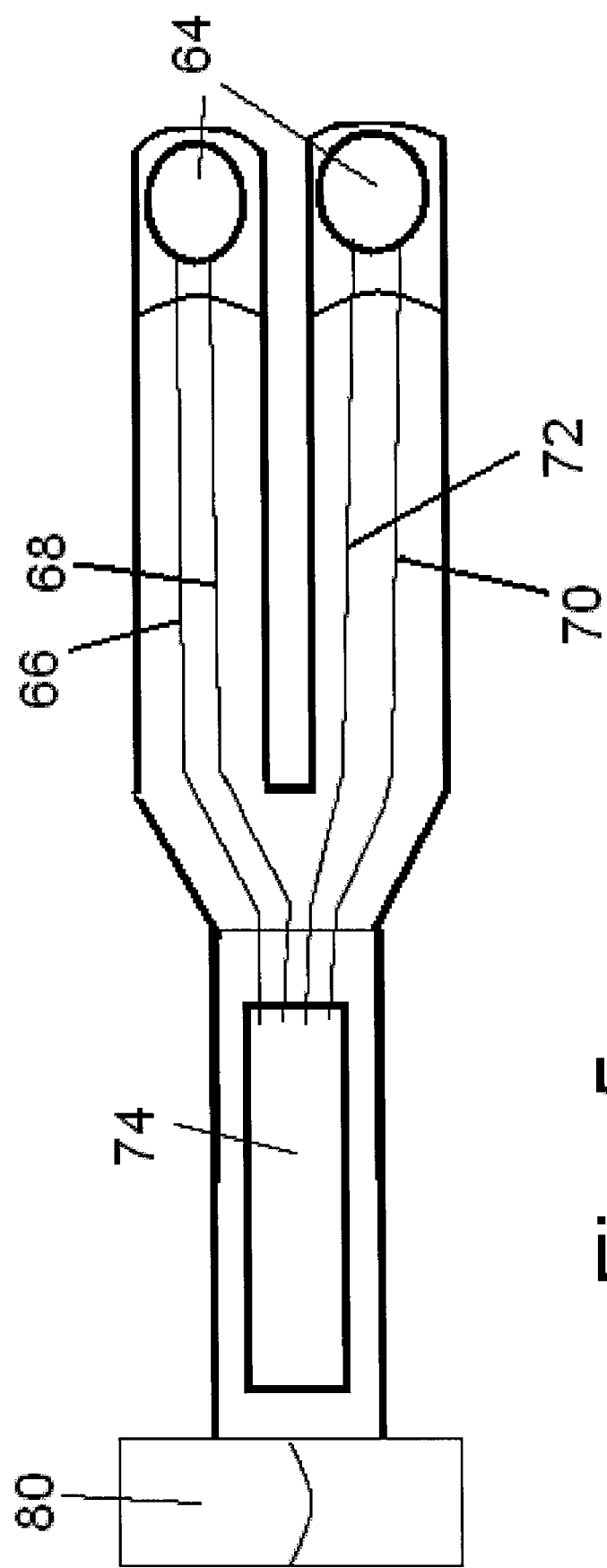
FIG. 5 is a schematic illustration of a controller incorporated into a glove.
Figure 6:
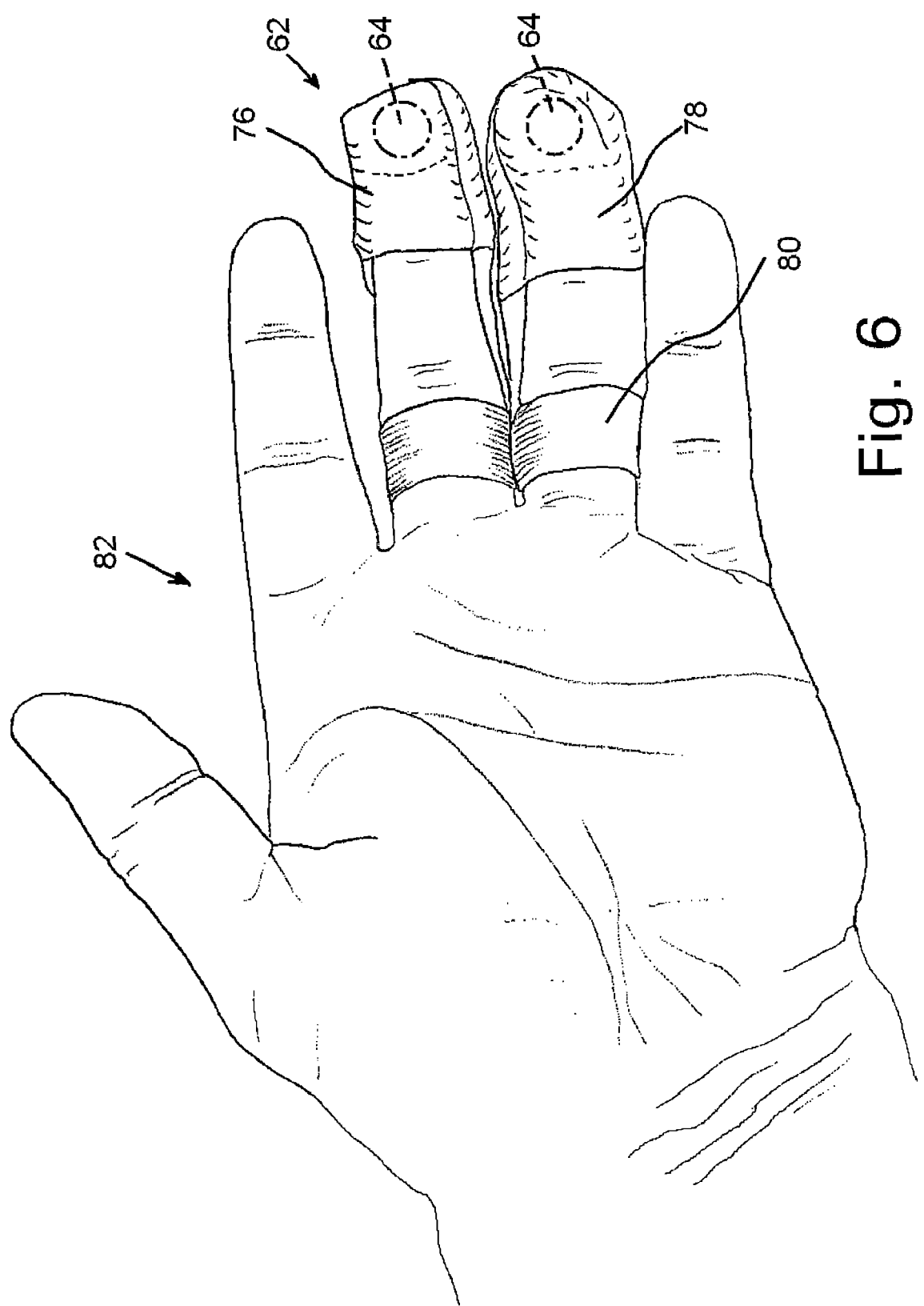
FIG. 6 is a pictorial view of such a controller worn on a users hand.

Referring now to FIGS. 5-7, according to another important aspect of the present invention, a wireless remote control unit 62 is provided. In preferred form, the controller 62 includes a pair of small and thin (button-like) momentary contact switches 64 which are connected by wires 66, 68, 70, 72 to a transmitter and power supply 74, which are also selected or constructed from well known and commercially available parts.

The wireless controller unit 62 may be constructed in the form of a partial "glove" such that the switches 64 are positioned at the tips of two of the users fingers. The switches 64 may be sewn or otherwise formed into finger stalls 76, 78 that cover only the fingertip region. The transmitter/battery unit 74 may be held in position on the back of the users hand or fingers by an attachment band or bands 80.

Referring now also to FIGS. 6 and 7, therein is shown an embodiment of the wireless controller unit 62 in place on the hand 82 of a user. In this embodiment control switches 64 are positioned over two of the users finger tip pads and held in place by stalls 76, 78 or partial glove fingers covering only end portions of the users fingers. These may be made of any appropriate fabric, leather or leather-like material. A similar soft enclosure 84 is provided for the transmitter/power supply 74. The enclosure 84 may be held in place on the back of the users fingers by two elastic loops 80. Alternatively, the unit 84 could be held in place on the back of the users hand 82 with a strap (not shown) that would elastically and/or releasably extend around the users wrist.

The stalls or fingertip glove portion 76, 78 may be elastically 86, 88 attached to the transmitter/battery unit cover 84. The elastic connectors 86, 88 may enclose the wires 66, 68, 70, 72 and will allow the unit 62 to fit various hand or finger sizes and lengths, as well as allowing the device 62 to be used on any adjacent pair of the users fingers.

Alternatively, both switches 64 could be enclosed in separate portions of a single glove finger, although placement on separate fingers is preferred. Also, the unit 62 could be built into a full glove. The illustrated embodiment, however, has the benefits of being usable on either the right or left hand and allows the user to choose which adjacent pair of fingertips will be used to manipulate the switches 64. Accordingly, the present invention allows complete flexibility as to where the users hand is positioned on the rifle stock and the same device may be used to its fullest extent by a variety of users in a single installation.

The foregoing description of a preferred embodiment of the present invention has been presented for purposes of illustration and description. It is not intended to be exhaustive or to limit the invention to the precise form disclosed. Obvious modification or variations are possible in light of the above teachings, some of which have been specifically identified and discussed above.

The illustrated embodiment was chosen and described to provide the best illustration of the principals of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings in the preferred embodiments do not and are not intended to limit the ordinary meaning of the claims and their fair and broad interpretation in any way.

What I claim is:

1. A system for power adjustment of an adjustable parameter of a telescopic sight, comprising:
    a power supply;
    a reversible motor;
    a reduction drive operably interconnecting said motor to an adjustable member of said telescopic sight;
    a wireless receiver operably connected to said power supply and said motor to selectively operate the motor so as to manipulate the adjustable parameter of the telescopic sight;
a housing for the power supply, motor, reduction drive, and receiver; and
    a wireless controller/transmitter in operable communication with said wireless receiver and operable by a user to provide at least two commands, said controller/transmitter including first and second momentary contact push button switches for controlling said commands and configured to be secured to at least one of the user's fingers in preselected positions such that said switches stay in place on the user's hand regardless of the user's hand position.

2. The system of claim 1, wherein the wireless controller is in communication with the wireless receiver via radio frequency signals.

3. The system of claim 1, wherein the adjustable parameter is a zoom mechanism.

4. The system of claim 1, wherein said reduction drive includes gears.

5. The system of claim 1, further comprising an at least partial glove to which the switches and the wireless controller/transmitter are attached.

6. The system of claim 5, wherein the switches are positioned in fingertip portions of separate glove fingers.

7. The system of claim 1, further comprising secondary control switches on said housing usable in the event of wireless controller/transmitter failure.

8. The system of claim 1, further comprising a visual indicator on said housing including indicia thereon for showing the position of said adjustable parameter of the telescopic sight.

9. The system of claim 8, wherein the indicator is mechanically operably connected to one of said reduction guide and said adjustable member of said telescopic sight.

10. The system of claim 1, further comprising a learnable operable communication system usable in the event of replacement of the controller/transmitter.

11. The system of claim 1, further comprising a learnable operable controller/transmitter for use with multiple receivers.

* * * * *